United States Patent Office 3,422,601
Patented Jan. 21, 1969

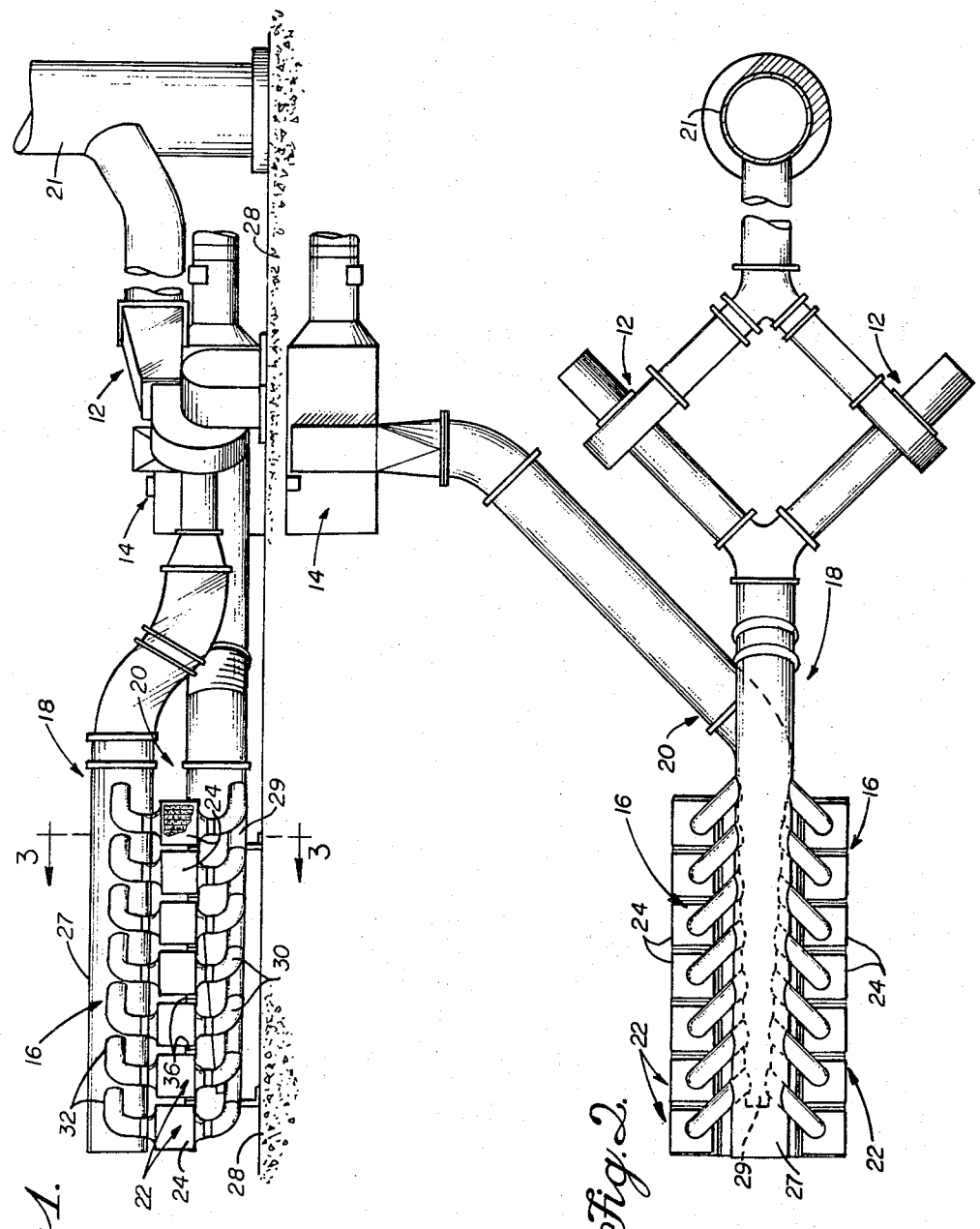

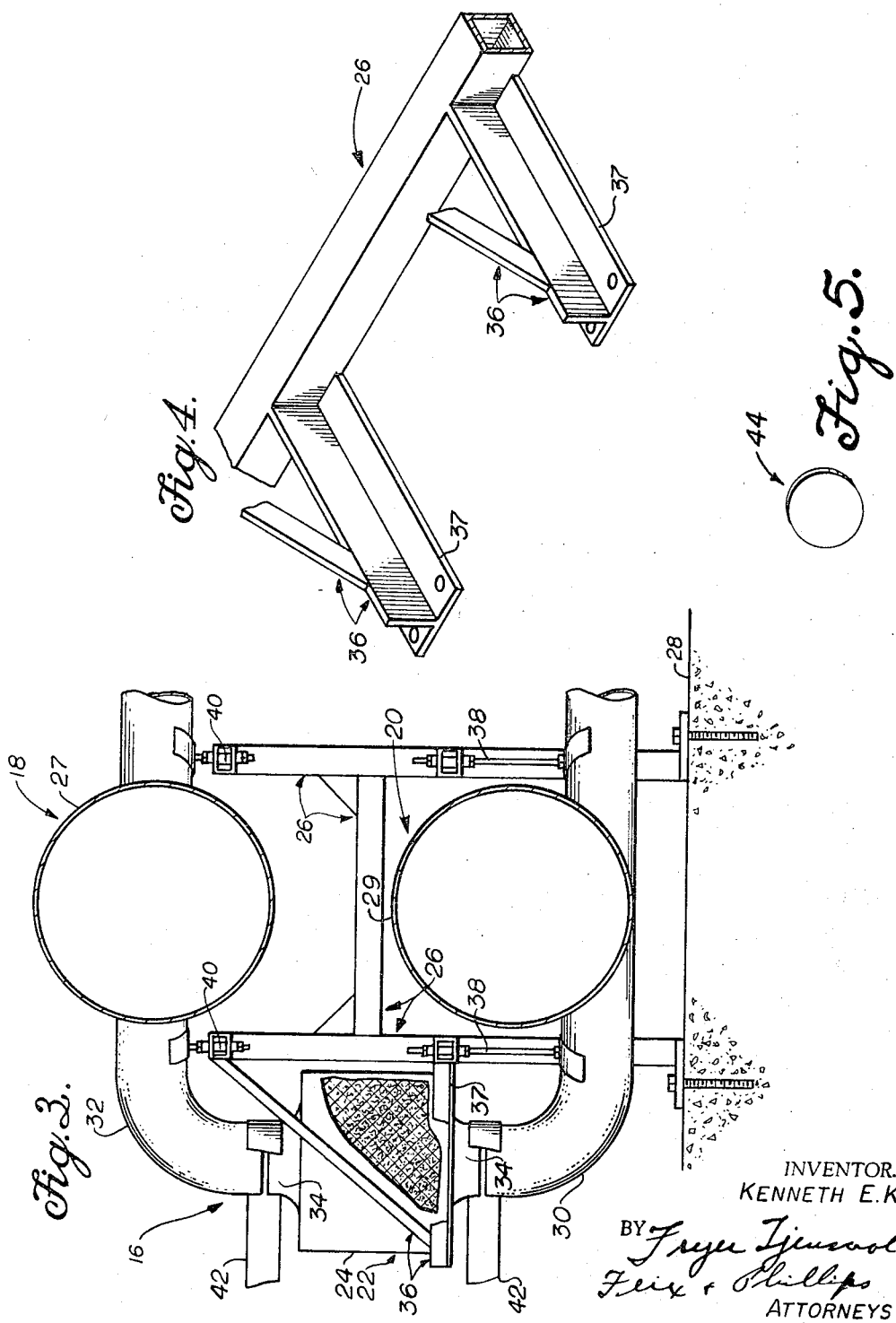

3,422,601
FILTER SYSTEM AND METHOD
Kenneth E. Kolb, 309 Apollo Way,
Pleasant Hill, Calif. 94523
Filed July 14, 1966, Ser. No. 565,137
U.S. Cl. 55—350                   1 Claim
Int. Cl. B01d 46/12

ABSTRACT OF THE DISCLOSURE

A method of filtering air contaminated by radioactive dust in a filter system which has a plurality of filters enclosed by housings with common inlet and outlet ducts opening into said housings, in which method a negative pressure is maintained in the ducts and a complete housing is removed when the filter element requires replacement without shutting down the system by capping the inlet and outlet ports in the housing to be replaced.

---

There are various air filter systems available for removing odors and/or dust and smoke particles from contaminated air, as well as various, more specialized systems utilized to filter radioactive particles from the air in atomic energy installations. Typical of the prior art filtering systems, and particularly those used in atomic energy installations, are the systems which employ a plurality of filters supported in a single housing. The filters are disposed to divide the housing into two parts and the contaminated air is passed by means of a pressure differential from one side of the housing through the filters into the other side of the housing, and thence to the outside for venting or rerouting. This filter configuration is undesirable in that the entire exterior surfaces of the filters within the housing, as well as the support structure thereof, become radioactive during operation of the filter system. Accordingly, to clean and/or replace the filters it is necessary to halt operation of the entire filter system before removing the filters, and wherein the entire housing containing the filters has to be placed in a plastic bag before the filters are removed to prevent the escape and scattering of radioactive particles.

The present invention overcomes the above-noted shortcomings of the prior art radioactive dust filtering systems by providing a plurality of filter means, any of which may be readily removed while the filter system continues to operate without the use of special precautions such as placing the filters in plastic bags or sealed containers prior to or during the removal thereof.

Although the invention is herein particularly described in conjunction with an atomic energy installation for filtering radioactive dust particles from an air medium, it is to be understood that the invention concepts are equally applicable to filter systems utilized in industry in general for cleaning dust and/or smoke laden air.

Accordingly, it is an object of the present invention to provide an air filtering system wherein the filter means are selectively accessible and readily removable for maintenance thereof.

It is another object of the invention to provide a radioactive dust filtering system as used for example in atomic energy installations wherein the filter means thereof are replaced with fresh filter means without the need for special precautions inherent in the operation of prior art systems for preventing the escape of radioactive particles.

It is a further object of the invention to provide a radioactive dust filter system utilizing a plurality of filter means any of which may be selectively removed during operation of the filter system without contaminating the room or atmosphere surrounding the location of the filter means.

It is yet another object of the invention to provide an air filter system wherein the flow of contaminated air through the filter means thereof is maintained by a pressure differential created by two negative pressures.

It is still another object of the invention to provide an air filter system wherein each filter means has its own respective housing and any dust collected is suspended in the filter material disposed entirely within the housing while the outside of the housing is not exposed to the flow of contaminated air.

It is a further object of the invention to provide an air filter system wherein the individual filters are secured on preadjusted rigid brackets and are detachably sealed in place within the filter system by means of an impervious tape.

Other objects and advantages will be apparent from the following specification taken in conjunction with the drawings, in which:

FIG. 1 is a simplified, side elevation of an exemplifying embodiment of the invention showing one bank of filter means.

FIG. 2 is a top view of the embodiment of FIG. 1, showing two banks of filter means.

FIG. 3 is an enlarged view of the filter means taken along line 3—3 of FIG. 1.

FIG. 4 is a perspective view of the mounting brackets for securing the filters of the filter means in place.

FIG. 5 is an isometric view of a sealing disk for capping used filters which are to be removed from the system.

Referring to the figures there is shown a filter system for removing radioactive dust from air and comprising basically, exhaust fans 12, damper box 14, two banks of filter means 16, an outlet duct 18 coupling the exhaust fans 12 to a common side of each bank of filter means 16, and an inlet duct 20 coupling the damper box 14 to the opposite common side of each bank of filter means 16.

Air contaminated with radioactive dust particles is drawn from a room or building having a contaminated atmosphere, and is passed through the damper box 14, the inlet duct 20, into the filter means 16, and from thence through the outlet duct 18 and the exhaust fans 12, whereupon the cleaned air may be vented into the atmosphere via, for example, a smokestack 21. However, after being cleaned the air may be rerouted for use within the installation if so desired, generally after it is reconditioned, e.g., heated, cooled, humidified and/or dehumidified according to the particular requirements of the installation.

Exhaust fans 12 provide and maintain a negative pressure in the outlet duct 18 as well as in inlet duct 20. Due to the pressure differential caused by the presence of the filter means 16 in the system, there is a lower pressure in outlet duct 18 than in the inlet duct 20. For example, in a system of this type with a pressure in the outlet duct 18, and thus on the outlet side of the filter means 16, substantially of the order of —12 inches of water, the pressure in the inlet duct 20 may be in the order of —8 inches of water. Thus a pressure differential is created across the banks of filter means 16 which draws the air from the contaminated atmosphere and causes the contaminated air to pass from the inlet duct 20 through the filter means 16 where it is filtered before it passes into the outlet duct 18. As may be seen from the figures, a plurality of individual filters 22 form the filter means 16, and each filter 22 has its own housing 24. Only the interior of the housing 24 is exposed to the contaminated air being filtered, and thus only the interior of the housing 24 contains radioactive particles at such time as the filters 22 are replaced.

Regarding now the filter means 16 and the manner of mounting and coupling same with respect to the ducts 18, 20, welded frame members generally indicated as 26 are disposed between the ducts 18, 20 and a concrete foundation 28 on the ground to provide an adjustable frame support for the ducts in suitably spaced-apart relation to one another and to the foundation 28. Although a particular support frame is herein depicted it is to be understood that any suitable support frame or assembly may be employed to replace that shown, the configuration thereof being commensurate to the arrangement and configuration of the ducts and the banks of filter means.

Filter inlet and outlet conduits 30 and 32 respectively, are integrally secured at one end as by welding, to the inlet and outlet ducts 20 and 18, respectively, along sections 29, 27 of the respective ducts, which portions 29, 27 desirably have parallel axes and extend along the bank of filter means 16. Accordingly, one filter inlet conduit 30 and one filter outlet conduit 32 define a pair of conduits which provides communication to the opposite sides of each filter 22 and thus a path for the flow of air therethrough. The ends of each pair of filter inlet and outlet conduits 30, 32 opposite the ends thereof which are welded to the ducts 20, 18 are disposed opposite each other in selected spaced-apart relation. The housing 24 of each filter 22 is provided with bell connecting ports 34 integrally formed therewith at opposite sides thereof, with the ends of members 34 having cross sections and dimensions matching those of the extended registering ends of the respective conduits 30, 32. As is shown in FIG. 3, the ends of the bell connecting members 34 are slightly spaced from the extended matching ends of respective conduits 30, 32.

Brackets 36 are provided to support the filters 22, and particularly the housings 24 thereof, in place between the ends of the conduits 30, 32 in the spaced relation as previously mentioned. The housing support portion of each bracket 36 is formed of a T member 37 rigidly secured in inverted relation to the frame member 26 and in vertically adjustable relation relative to the conduits 30, 32. The adjustment between the ends of conduits 30 and respective bell connecting members 34 is provided by adjustable threaded bolt assemblies 38 secured at opposing ends thereof between the conduits 30 and the frame member 26. Similar adjustable threaded bolt assemblies 40, secured at opposite ends thereof between the outlet conduits 32 and the frame member 26, provide vertical adjustment for the conduits 32 relative to the respective bell connecting members 34 of the filter housing 24.

Connecting members 34 and conduits 30 and 32 are joined by a suitable removable sealing means, such as a length of nonpermeable tape 42 of the type having an adhesive surface and a somewhat resilient plastic film base which is impervious to air. Tape 42 is wrapped about the space or joint between the bell connecting members 34 and the respective ends of the conduits 30, 32 to provide a seal and thus prevent the escape of radioactive dust and/or air therefrom. Thus the filter 22 is sealed in place within the filter system via the extremely simple expedient of the readily applied length of tape 42, which is just as readily removed during replacement of the filters 22.

In order to remove any selected filter 22 from the bank of filter means 16 to replace it with a fresh filter at such time as the installed filter 22 is saturated with radioactive dust, a unique method of replacing the individual filters has been devised. This method relies upon the principle that particulate matter as well as gas or vapor molecules suspended in an air stream are carried in the direction of air flow, and that the filter housings in the present system may readily be sealed for safe removal. Since both the inlet and outlet ducts are under a negative pressure relative to the surroundings, the entire inside volume of the filter bank assembly is also under a negative pressure. Thus any opening in the system will produce an air flow from the surroundings into the system, and particulate matter, gas or vapor within the filter system cannot escape outward to the surroundings against the inflow of air.

The procedure for changing filters is commenced by removing the upstream tape 42, and then sliding a sealing disk 44 into the exposed slot between inlet conduit 30 and the bell connecting member 34. It should be noted that the sealing disk may have any shape which will permit it to seal connecting member 34. The sealing disk 44 is of a suitable thickness to permit it to be inserted into the slot between the bell connecting members and the adjacent conduits. Sealing disk 44 is pushed against the bell member 34 to close the opening, and the disk is fastened in place by sealing tape or any suitable mechanical fastening means. At this time all material collected by the filter is effectively sealed within the filter housing and a high velocity air stream is flowing from the outside surrounding air through the exposed opening in inlet conduit 30.

Next the downstream tape 42 is removed and a second sealing disk 44 is slipped into the resultant slot. This second sealing disk is sealed to the adjacent bell connecting member 34 in the same manner as the first sealing disk. The filter housing, including the bell connecting members, is then completely sealed. After the filter housing has been completely sealed, it is slid forward on the supporting T-members 37 and then carried away for disposal. During this time, air flows from the surrounding atmosphere into the filter inlet and outlet conduits 30 and 32 because of the negative pressure in such conduits. If desired the total flow of air into the filter system may be reduced by including restricting dampers in the exhaust conduits, although such dampers are not necessary.

It may be seen that the filter 22 can be selectively removed without stopping the operation of the filter system of the invention, beyond reducing the flow therethrough in proportion to the filter capacity of the remaining filters 22, and without taking any special precautions with regard to the radioactivity within the filters 22 and with regard to the open ends of the conduits 30. It should be noted that the "filter frame," viz., the housing 24 exterior as well as brackets 36, are never in contact with any flow of contaminated air, as is generally the case in prior art systems. Accordingly, the contaminated filter 22 including its housing 24 may be removed and disposed of without the special precautions required if the exterior of the removable unit had been exposed to the contaminated air being filtered.

A new filter 22 and housing 24 may then be inserted while the remainder of the filter system continues in operation. This is accomplished by placing a new filter unit including housing 24 on the supporting T-member 37 and sliding the housing along the T-members until the bell connecting ports 34 are in axial alignment with the inlet and outlet conduits 30 and 32. The bell connecting ports are then sealed to the inlet and outlet conduits by means of new tapes 42.

The filter 22 may be formed of any of the various filtering elements known in the art, disposed and retained as an integral internal element within the housing 24. For example, an absolute filter formed of fibers shaped over dividers to provide convolutions is useful as the filter element.

Although the invention has been described herein with respect to a single embodiment, it is to be understood that various modifications and changes may be made thereto within the spirit of the invention. For example, although the filter means 16 and ducts 18, 20 are shown and described with the air passing through the filters 22 in a vertically rising direction, the invention could be modified to operate with the air flowing in a vertically downward or a horizontally oriented path through the filters 22. However, an upflow is preferred since the air pressure then tends to prevent the filter from sagging as the filter accumulates the dust being filtered. Although the inlet and outlet flow conditions of the filter means 16 may be varied, the inlet flow thereto is generally held to a constant velocity to retain the suspended dust or matter evenly within the filter 22 all the way to the surfaces thereof. Note that the parallel portion 29 of the inlet duct 20 may be tapered to effect a form of regulating action to provide a more evenly distributed flow of contaminated air to the series or bank of filters 16. Although exhaust fan means 12 is shown herein as a single fan system other configurations or combinations of fans or air pumping systems could be utilized in place thereof. Although two banks of filter means 16 having seven filters 22 in each bank are herein particularly shown, it is to be understood that any plurality of such filters which are readily removable may be employed. The various portions of the system, e.g., housing 24, ducts 18, 20, conduits 30, 32 may be formed of any of the various construction materials such as for example, stainless steel, aluminum, steel and/or solid plastic in any of the conventional cross sections. Furthermore, since there are no moving, rotating or rubbing parts in the banks of filter means 16, the various surfaces therewithin may be coated with various materials such as polyvinyl chloride if desired, by dipping, spraying and/or otherwise depositing the material thereon. Also, the filter system of the invention is readily adapted to include air flow, pressure drop, and/or radiation measurement apparatus for individual and/or any combination of filters 22 within the banks, to thereby allow monitoring and sampling of respective variable operating characteristics of the filters of the filter system.

I claim:

1. A method of filtering air contaminated by radioactive dust in an air filtration system; which system includes an air inlet duct; and air outlet duct vertically spaced above said air inlet duct; at least two inlet conduits fluidly communicative with said air inlet duct; at least two outlet conduits fluidly communicative with said air outlet duct; each of said outlet conduits being vertically spaced above said inlet conduits; a plurality of filter means; each filter means operatively coupled between an inlet conduit and an outlet conduit; and each filter means comprising a filter housing, a filter element enclosed by said housing; each housing being provided at its upper end thereof with an air outlet port and at its lower end thereof with an air inlet port; said filter element operatively disposed between said inlet port and said outlet port; a first connecting member detachably connecting an inlet port of each filter housing to a respective inlet conduit, a second connecting member detachably connecting an air outlet port of each filter housing to a respective air outlet conduit; tape means associated with said first and second connecting members for sealing said connecting members respectively to the air inlet and outlet conduits; which method comprises the steps of:

creating a negative pressure in said air inlet duct;

creating a negative pressure in said air outlet duct lower than the pressure in said air inlet duct and producing an air flow through each inlet conduit upwardly through each of said filter housings and through each of said outlet conduits;

removing a selected one of the sealing tape means from an inlet conduit and a first connecting member at the lower end of a filter housing to be replaced, and exposing said inlet conduit and the air inlet port of said filter housing to atmospheric pressure;

fastening in sealing relationship a first disc means to said first connecting member of a filter housing to be replaced;

removing a selected one of the sealing tape means from an outlet conduit and a second connecting member at the upper end of said filter housing to be replaced, and exposing said outlet conduit and the air outlet port of said filter housing to atmospheric pressure;

fastening a second disc means in sealing relationship to said second connecting member of said filter housing to be replaced, said first and second disc means cooperating to seal said filter housing and prevent escape of material from said housing;

removing said sealed filter housing from said system;

replacing the removed filter housing with another filter housing provided with a fresh filter element therein and disposed between an air inlet port at the lower end and an air outlet port at the upper end of said filter housing each of said ports having a connecting member operatively associated therewith;

sealing with tape means the connecting members of said another filter housing respectively to the exposed inlet and outlet conduits;

continuously maintaining the interior of said system under negative pressure during the removal of the filter unit to be replaced and preventing the escape of contaminants from the exposed inlet and outlet conduits;

continuously fluidly communicating the interior of said air inlet duct with a source or air containing radioactive dust; and continuously passing air containing radioactive dust through the remaining plurality of filter means during the removal of said filter means to be replaced and the insertion of said another filter housing provided with a fresh filter element therein.

References Cited

UNITED STATES PATENTS

| | | | |
|---|---|---|---|
| 1,455,116 | 5/1923 | Lumley | 55—350 X |
| 2,364,573 | 12/1944 | Vokes | 55—481 |
| 2,606,344 | 8/1952 | Clark | 55—350 X |
| 2,804,165 | 8/1957 | Blomgren et al. | 55—481 X |
| 3,090,180 | 5/1963 | Berz et al. | 55—300 X |
| 1,974,952 | 9/1934 | Eiben | 55—341 |
| 2,084,408 | 6/1937 | Mueller | 55—481 X |

FOREIGN PATENTS

| | | |
|---|---|---|
| 1,324,386 | 3/1963 | France. |
| 986,952 | 3/1965 | Great Britain. |
| 999,660 | 7/1965 | Great Britain. |

OTHER REFERENCES

German printed application No. 1,091,415; printed October 1960 (4 shts. dwg., 2 pp. spec.).

Ventilation and Air Purification Equipment for Civil Defense Protective Shelters, Flanders Filters Incorporated; Riverhead, New York, N.Y., copyright 1961, received in Patent Office Sept. 24, 1965, pages 10–17.

FRANK W. LUTTER, *Primary Examiner.*

DENNIS E. TALBERT, JR., *Assistant Examiner.*

U.S. Cl. X.R.

55—481, 502, 505